United States Patent [19]
Zettler

[11] Patent Number: 4,579,002
[45] Date of Patent: Apr. 1, 1986

[54] THERMOCOUPLE VACUUM GAUGE

[75] Inventor: John F. Zettler, Stow, Mass.

[73] Assignee: Varian Associates, Inc., Palo Alto, Calif.

[21] Appl. No.: 667,021

[22] Filed: Oct. 31, 1984

[51] Int. Cl.⁴ .............................................. G01L 21/14
[52] U.S. Cl. ..................................... 73/755; 374/164; 374/179
[58] Field of Search .................. 73/755; 374/164, 179

[56] References Cited
U.S. PATENT DOCUMENTS 3,066,537 12/1962 Rivera .................................. 73/755
3,397,579 8/1968 Harvey ................................ 73/755
3,905,230 9/1975 Calvet et al. ....................... 73/755

Primary Examiner—Donald O. Woodiel
Attorney, Agent, or Firm—Stanley Z. Cole; Kenneth L. Warsh

[57] ABSTRACT

A thermocouple pressure gauging system for measuring partial vacuum is provided which uses time multiplexing to alternately heat the thermocouple to constant temperature and then measure the EMF from thermocouple with heating current off. A signal proportional to pressure is derived from the heating duty cycle. The pressure signal is in turn used to derive a reference signal which is compared to the EMF from the thermocouple to control the heating of the thermocouple.

8 Claims, 15 Drawing Figures

THERMOCOUPLE VACUUM GAUGE

FIELD OF THE INVENTION

This invention pertains to a thermocouple apparatus to measure low pressures under partial vacuum, more particularly to an apparatus sensitive to pressures over a wider range.

BACKGROUND OF THE INVENTION

Thermocouples have long been used as a pressure sensing device for partial vacuums. The thermocouple is heated and the resulting temperature of the thermocouple is measured using the thermocouple EMF. As the gas pressure falls the rate of cooling of the thermocouple by the gas decreases. As a result, either the temperature of the thermocouple for constant heating current rises or the current needed to keep the thermocouple at constant temperature decreases.

Thermocouple pressure gauges of the prior art are limited in their range and sensitivity by the noise generated by simulataneous heating during measurement. Prior art thermocouple gauges are insensitive at low pressures and in the range of pressures 10–100 Torr.

OBJECTS OF THE INVENTION

The object of the invention is to provide an inexpensive, modestly accurate, fast responding vacuum indicator using the thermocouple effect over many orders of magnitude of pressure.

BRIEF SUMMARY OF THE INVENTION

A time-multiplexed servomechanism is used to supply a duration modulated constant amplitude heating pulse to the thermocouple. In the intervals between heating, the EMF of the thermocouple is measured and compared to the reference voltage. The reference voltage is different for different ranges of pressure and in some ranges it becomes proportional to decreases in pressure. The duty cycle of the heating pulses is converted to voltage and displayed as pressure.

These and further constructional and operational characteristics of the invention will be more evident from the detailed description given hereafter with reference to the figures of the accompanying drawings which illustrate preferred embodiments and alternatives by way of non-limiting examples.

DESCRIPTION OF THE PREFERRED EMBODIMENTS

Figure 1:
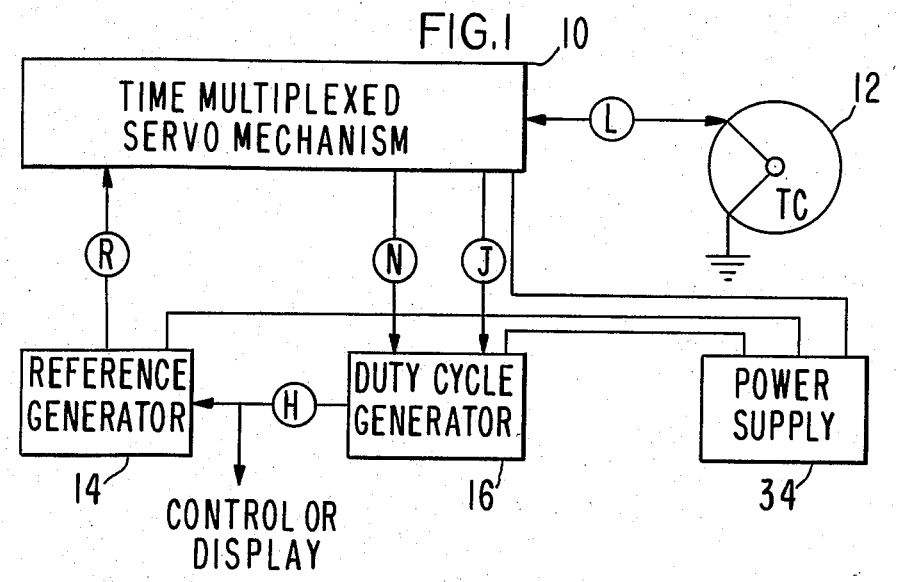
FIG. 1 is a block diagram of the thermocouple vacuum gauge according to the invention.
Figure 3:
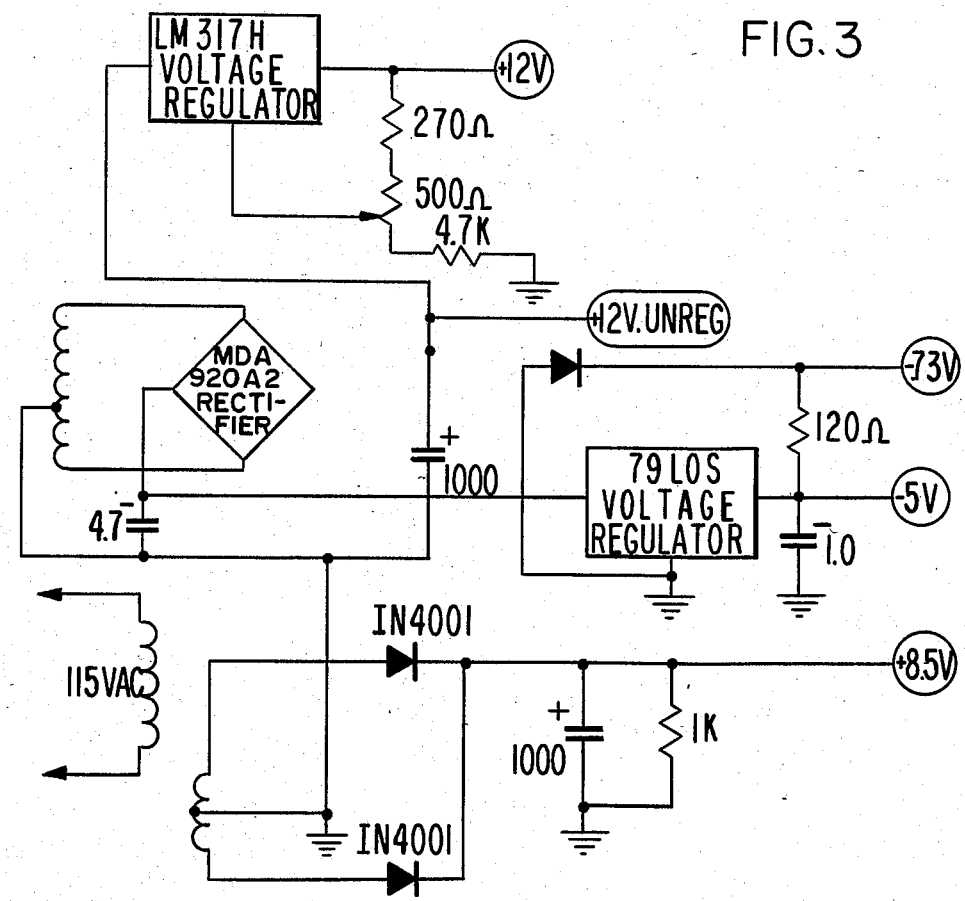
FIG. 3 is a schematic diagram of the power supply in one embodiment of the invention.

Referring now to the drawings wherein reference numerals are used to designate parts throughout the various figures thereof and letters to designate signals passed between parts, there is shown in FIG. 1 a block diagram of the thermocouple pressure gauge according to the invention. A time-multiplexed servomechanism 10 is used to supply a frequency modulated constant ampliltude current "L" to a two wire of four wire thermocouple 12. In the interval between heating pulses, the thermally generated EMF, "L" is measured, and compared to a reference voltage level "R" derived by a reference generator 14. The current needed to heat the junction is signalled with voltages "N" and "J" to duty cycle generator 16. The duty cycle generator 16 derives a signal "H" which is proportional to the pressure and is used for control or display and with a reference voltage "B" from the power supply is input to the reference generator 14 which generates the reference signal "R".

Figure 2:
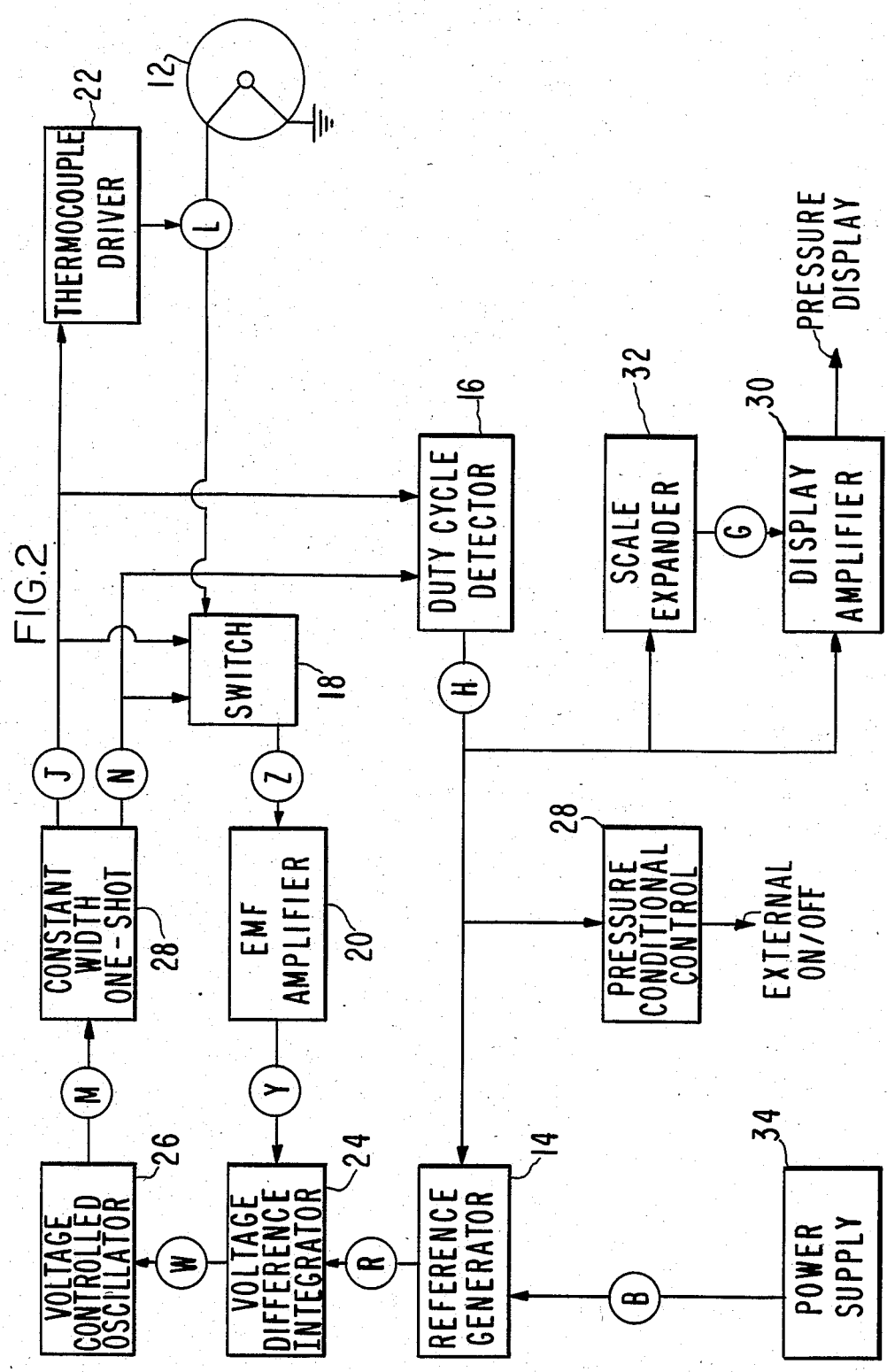
FIG. 2 is a block diagram of an embodiment of the invention.
Figure 4:
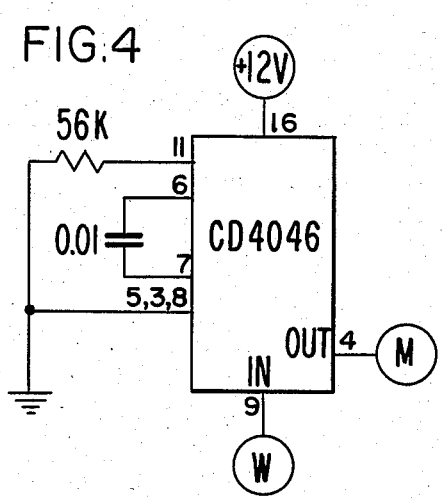
FIG. 4 is a schematic diagram of the voltage controlled oscillator in one embodiment of the invention.
Figure 5:
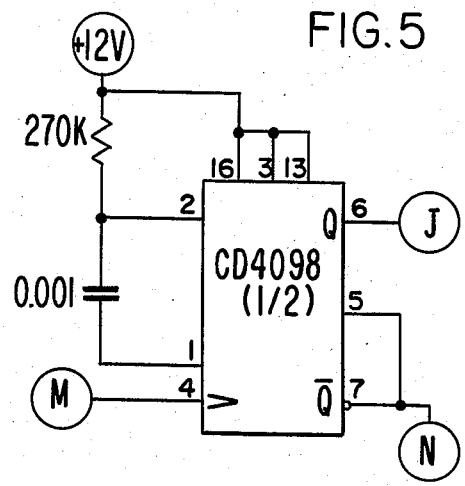
FIG. 5 is a schematic diagram of the constant width one-shot in one embodiment of the invention.
Figure 6:
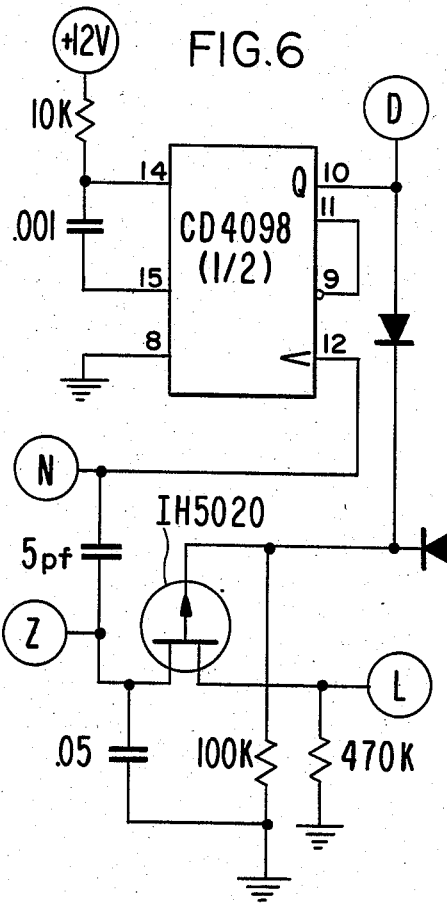
FIG. 6 is a schematic diagram of the switch in one embodiment of the invention.
Figure 7:
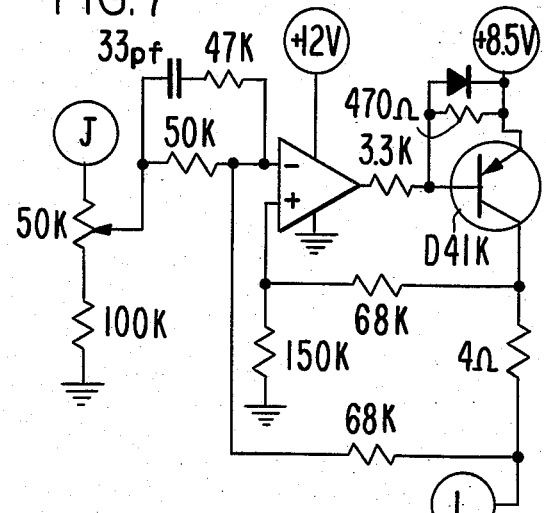
FIG. 7 is a schematic diagram of the thermocouple driver in one embodiment of the invention.
Figure 8:
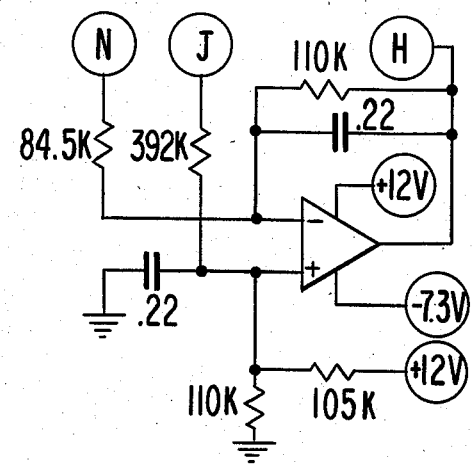
FIG. 8 is a schematic diagram of the duty cycle generator in one embodiment of the invention.
Figure 9:
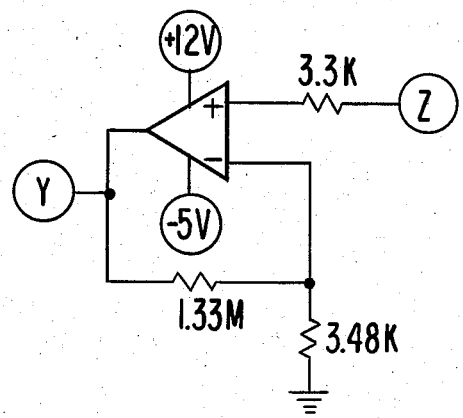
FIG. 9 is a schematic diagram of the amplifier in one embodiment of the invention.
Figure 10:
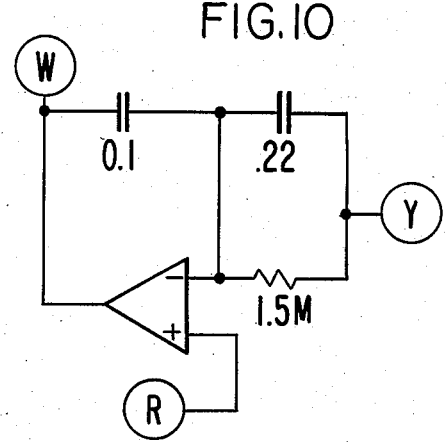
FIG. 10 is a schematic diagram of the voltage difference integrator in one embodiment of the invention.
Figure 11:
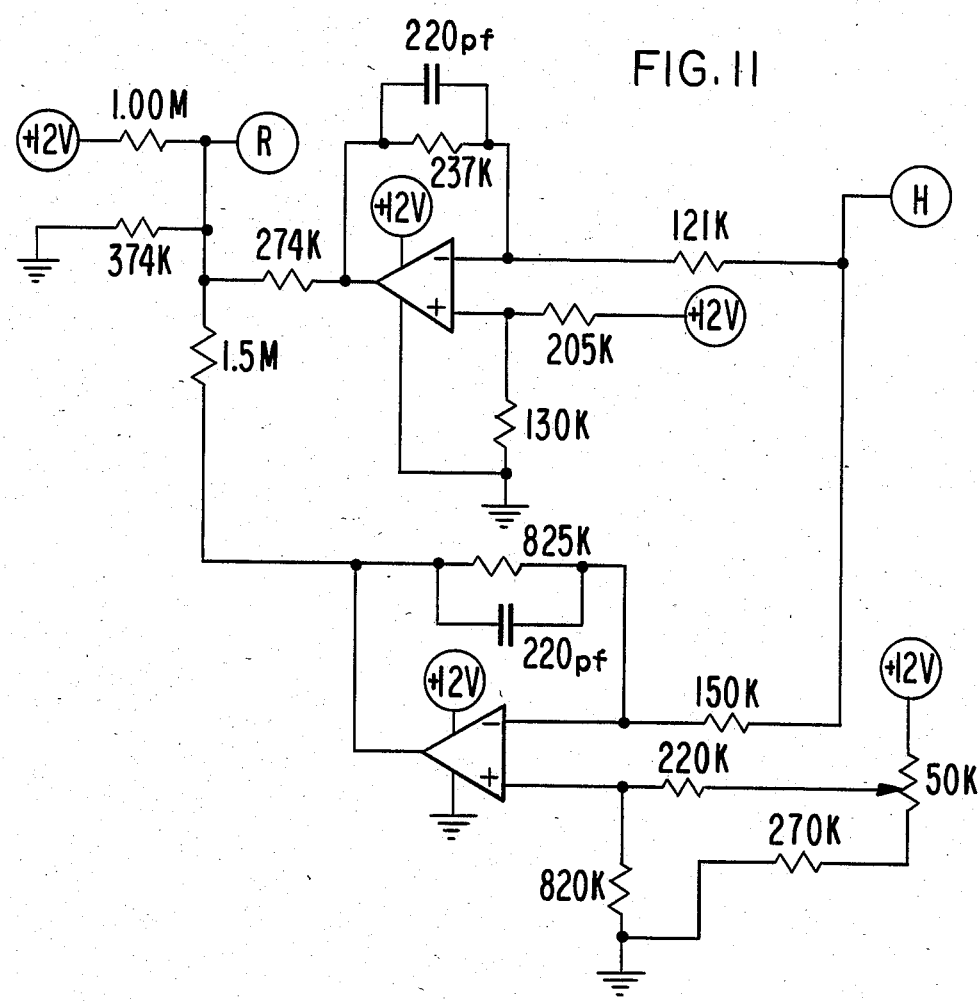
FIG. 11 is a schematic diagram of the reference generator in one embodiment of the invention.
Figure 12:
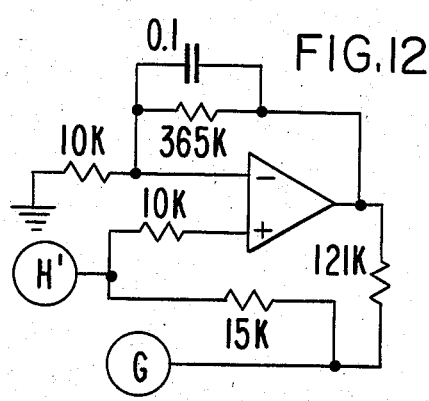
FIG. 12 is a schematic diagram of the scale expander in one embodiment of the invention.
Figure 13:
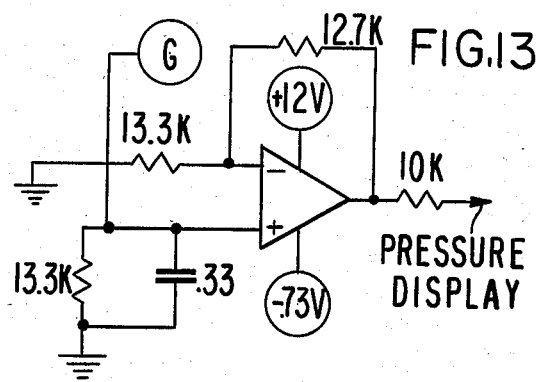
FIG. 13 is a schematic diagram of the display amplifier in one embodiment of the invention.
Figure 14:
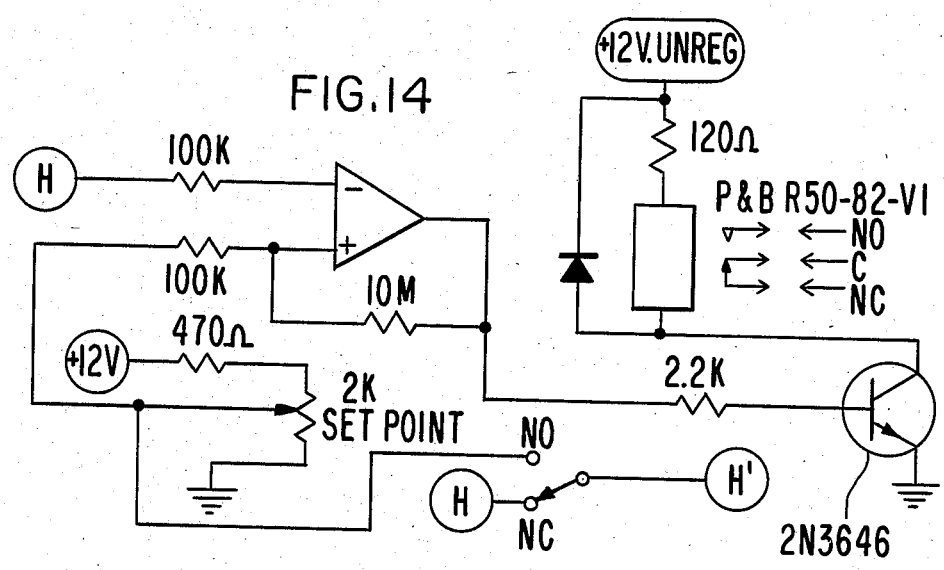
FIG. 14 is a schematic diagram of the pressure conditional control in one embodiment of the invention.

A more detailed example of the preferred embodiment of the invention is shown in FIG. 2. A central part of the time-multiplexed servomechanism is the switch 18 which time-multiplexes the EMF signal from the thermocouple. The signal "J" is sent to the switch 18 to disconnect the EMF signal "Z" to the EMF amplifier 20 and simultaneously to connect the thermocouple driver 22 to heat the thermocouple. The signal "D" extends the time in which "Z" is disconnected by the switch 18 by a small amount of time to allow the current from the thermocouple driver 22 to decay to zero current. The amplified EMF signals "Y" is sent from the amplifier 20 to the voltage difference integrator 24 which integrates the signals "R-Y" to generatethe signal "W". The signal "W" is used in turn to control the voltage controlled oscillator 26. The pulse frequency signal "M" from the voltage controlled oscillator 26 is sent to the constant width one-shot 28 which in turn generates the signals "J" and "N".

The signal "H" which is proportional to the pressure can be sent to a pressure conditional control 28 which can be used to open or close valves, turn-on or turn-off pumps or take other appropriate action when the pressure crosses a preset level. Either polarity of action may take place when pressure either exceeds or falls below the preset level. A multiplicity of set points is also allowable. The pressure signal "H" can also be sent to a display amplifier 30. A scale expander 32 amplifies the signal "H" when small and saturates at large signals deriving thereby the signal "G" which is sent to the display amplifier 30. A conventional power supply 34 is used to supply appropriate voltages to other circuits.

Detailed diagrams of each of these circuits are shown in FIGS. 3 through 14. All operational amplifiers are RCA CA3260. All unlabelled diodes are small signal diodes, typically 1N914.

Figure 15:
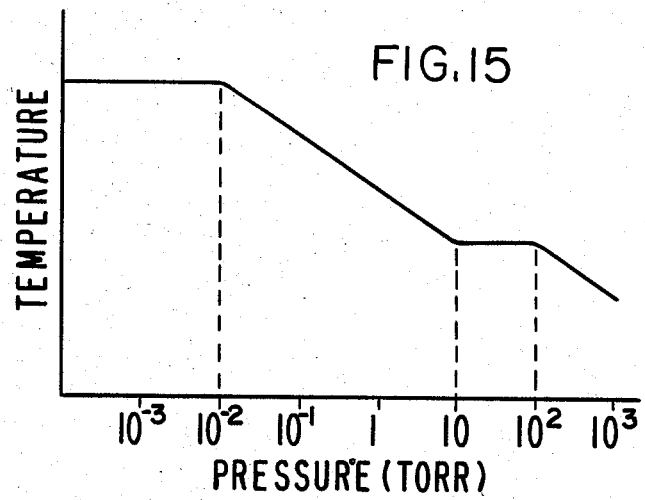
FIG. 15 is a schematic diagram of the temperature of the thermocouple versus pressure.

At low pressure, the effect of heat loss through unwanted metallic conduction via the thermocouple wire and electromagnetic radiation are significant compared to the loss of heat by gaseous diffusion, which is the mechanism sensitive to pressure. By operating at a constant temperature in the low pressure region, the effect of temperature on conductive cooling is eliminated and its effect on radiative loss is reduced. If temperature is constant with pressure, the effect of gaseous cooling is maximized. The regions where such high sensitivity is desirable are below 10 milliTorr and between 10 and 200 Torr. In regions where the thermocouple gauge is inherently sensitive to gaseous cooling, it is desirable to decrease the sensitivity by decreasing the temperature with increasing pressure. These regions are between 10 milliTorr and 10 Torr and between 200 Torr and atmospheric pressure. A schematic diagram of temperature versus pressure for these regions is shown in FIG. 15. Manipulating the temperature as hereinbefore described allows effective measurement of pressure and enhances scale linearity over a wider range than heretofore possible, approximately six orders of magnitude.

The above-described temperature variation allows for a high temperature, with accompanying enhanced sensitivity to pressure changes at low pressures where the danger of gas explosions due to the high temperature of the thermocouple does not exist, but at the same time, reduces the junction temperature to much lower, safer values at pressures where such a hazard may exists in certain gases.

The duty cycle method of indicating, and the incorporation of an indicator into the servo loop, circumvents many sources of error which would arise due to environmental changes. This minimizes the extra cost incurred in compensating for such changes.

The time-multiplexed heating of the junction provides two major advantages: (i) During the interval that the thermal EMF is measured, there are no extraneous contributions to the measured voltage from the heating mechanism. Such errors are inherent in any other technique which uses DC power. (ii) Only a two wire junction is required, where previously a four wire junction was necessary. This results in several benefits, including a two wire cable from controller to gauge, a simplified gauge, and a 50 percent reduction in unwanted thermal conduction since the number of thermal conduction paths have been halved.

This invention is not limited to the preferred embodiments heretofore described, to which variations and improvements may be made without leaving the scope of protection of the present patent, the characteristics of which are summarized in the following claims.

What is claimed is:

1. A system for deriving an electrical signal which is proportional to pressure at partial vacuum comprising:
    a thermocouple in a partial vacuum;
    servomechanism means for time-multiplexing a pulsed heating current to said thermocouple with a voltage signal from said thermocouple, said servomechanism generating timing signals;
    means for generating a signal proportional to the pressure from a duty cycle of said timing signals;
    means for generating a reference signal from said signal proportional to pressure, said reference signal being used with said voltage signal from said thermocouple to generate heating current pulses; and
    power supply means connected to said system.

2. A system for deriving an electrical signal which is proportional to pressure at partial vacuum as in claim 1 wherein said servomechanism means includes
    a voltage controlled oscillator means for generating a frequency signal;
    a constant width one-shot means for receiving said frequency signal from said voltage controlled oscillator and generating timing signals;
    a thermocouple driver means for receiving said timing signals and sending a constant amplitude pulsed current to said thermocouple;
    a switch means for receiving said timing signals and passing a thermocouple voltage signal when said thermocouple is not being heated;
    means for amplifying said thermocouple voltage signal from said switch means; and
    means for taking the difference between said amplified thermocouple voltage and said reference signal and for integrating said difference, said integrated difference signal being input to said voltage controlled oscillator.

3. A system for deriving and electrical signal which is proportional to pressure at partial vacuum as in claims 1 or 2 including a
    means for amplifying small pressure signals more than large pressure signals.

4. A system for deriving and electrical signal which is proportional to pressure at partial vacuum as in claim 3 including
    means for deriving a pressure conditional control from said signal proportional to pressure.

5. A system for deriving and electrical signal which is proportional to pressure at partial vacuum as in claims 1 or 2 where the temperature of the thermocouple is held constant at pressures below approximately 10 milliTorr and decreases with increasing pressure above approximately 10 milliTorr.

6. A system for deriving an electrical signal which is proportional to pressure at partial vacuum as in claim 5 where the temperature of the thermocouple is held constant between approximately 10 and 200 Torr.

7. A system for deriving an electrical signal which is proportional to pressure at partial vacuum as in claim 6 where the temperature of the thermocouple decreases with increasing pressure above approximately 200 Torr.

8. A method of operating a thermocouple gauge in partial vacuum comprising the steps of alternately providing a heating current to a thermocouple junction and then measuring a thermally generated EMF from said thermocouple junction with said heating current off, generating a signal proportional to pressure from a duty cycle of said heating current, generating a reference signal from said signal proportional to pressure, and generating heating current pulses from said thermally generated EMF and said reference signal.

* * * * *